United States Patent
Goujon

[19]

[11] Patent Number: 5,941,826
[45] Date of Patent: Aug. 24, 1999

[54] METHOD FOR ADJUSTMENT OF THE DOPPLER ANGLE IN ECHOGRAPHY, AND ARRANGEMENT FOR CARRYING OUT THE METHOD

[75] Inventor: Antoine Goujon, Paris, France

[73] Assignee: U.S. Philips Corporation, New York, N.Y.

[21] Appl. No.: 08/754,361

[22] Filed: Nov. 22, 1996

[30] Foreign Application Priority Data

Nov. 23, 1995 [FR] France .................................. 95 13962

[51] Int. Cl.⁶ .................................................. A61B 8/00
[52] U.S. Cl. ........................................... 600/451; 600/454
[58] Field of Search .................................. 600/443, 453, 600/451, 454

[56] References Cited

U.S. PATENT DOCUMENTS

| | | | |
|---|---|---|---|
| 4,803,990 | 2/1989 | Bonnefous et al. | 128/661.1 |
| 5,454,372 | 10/1995 | Banjanin et al. | 600/454 |
| 5,513,640 | 5/1996 | Yamazaki et al. | 600/451 |
| 5,595,182 | 1/1997 | Krivitski | 600/454 |

FOREIGN PATENT DOCUMENTS

0210624A2 4/1987 European Pat. Off. .

OTHER PUBLICATIONS

"Traitement Numerique des Images", By Murat Kunt, Collection Technique et Scientifique des Telecommunications Presses Polytechniques et Universitaires Romanes.

*Primary Examiner*—William E. Kamm
*Assistant Examiner*—Maulin Patel
*Attorney, Agent, or Firm*—Jack D. Slobod; Dwight H. Renfrew

[57] ABSTRACT

The Doppler angle is adjusted to a value close to the optimum Doppler angle DAopt, typically amounting to 60°, between the direction of an echographic excitation and the axis of a blood vessel in an echographic image, based on prior designation of an initial point in the vessel. The method includes a first measurement of the Doppler angle DA1 in a first, predetermined excitation direction, comparison of DA1 with Daopt, formation of $\Delta\theta=|DAopt-DA1|$, and correction of the direction of the echographic excitation by the value $\Delta\theta$ in order to shift it to a second direction.

20 Claims, 4 Drawing Sheets

METHOD FOR ADJUSTMENT OF THE DOPPLER ANGLE IN ECHOGRAPHY, AND ARRANGEMENT FOR CARRYING OUT THE METHOD

The present invention relates to a method for measurement and to a method for adjustment of the Doppler angle between the direction of an echographic excitation line and the axis of a blood vessel in an ultrasonic echographic image, formed as a two-dimensional matrix of pixels in grey levels, on the basis of the prior designation of an initial point situated in the vicinity of the axis of the relevant vessel.

BACKGROUND OF THE INVENTION

The invention also relates to an arrangement for carrying out the methods.

In order to provide a quantitative measurement of the velocity of the blood in the arteries a method for the ultrasonic imaging of velocities is based essentially on knowing the angle between the incident ultrasonic beam and the local axis of the vessel. The resulting information can be displayed, for example, by color encoding. This holds for all ultrasonic signal processing methods currently used to produce a color-encoded representation of the flows in any commercially available echography apparatus. Moreover, reliable determination of this so-called Doppler angle is necessary in order to enable extraction of echographic data of parameters whose measurement is rather complex, thus making further progress in the study of, for example arterial behavior.

Therefore, it would be important to realize a method for extracting the value of the Doppler angle from a medical ultrasonic image that can be carried out automatically with a high precision, for example within about 1 degree.

The Doppler angle still is a difficult topic in all commercially available apparatus: the operator must determine the value thereof in a rather approximate manner by judging the alignment of a small line segment he traces in the image with respect to the axis of the blood vessel studied.

SUMMARY OF THE INVENTION

In accordance with the invention, such a method for measurement of the Doppler angle enclosed by the trace of a blood vessel in an echographic image, starting from a designated point in the direct vicinity of said trace, may include the following steps:

a) a first isotropic tracing of rays from said initial point, said rays traversing the echographic image so as to provide a histogram of the grey levels of selected points which are distributed along said rays, b) applying an algorithm to said histogram in order to classify the grey levels of said selected points into at least two classes $CL_1$, $CL_2$, ..., two adjoining classes being separated by thresholds $T_1$, $T_2$, ..., expressed in grey levels, one of the classes $CL_i$, bounded by the lower threshold $T_{i-1}$, being representative of the grey levels of the walls of the blood vessels in said image, c) determining with a second tracing of rays from said initial point, the first point P1 for each ray at which the grey level is equal to or higher then the threshold $T_{i-1}$, yielding a representation of said blood vessel in the form of a set of N pixels having the coordinates $x(n)$ and $y(n)$, d) determination of the slope a of the inertial axis from said set of N pixels, as:

$$a = \frac{-2(S)x(n)y(n)}{(S)x(n)x(n) - (S)y(n)y(n) + \sqrt{4((S)x(n)y(n)^2) + ((S)x(n)x(n) - (S)y(n)y(n))^2}} \quad (1)$$

where (S) means:

$$\sum_{n=1}^{n=N}$$

e) and calculation of the Doppler angle as:
    DA = Arc tg (a).

An echographic image very often contains the trace of several vessels. Therefore, the operator wishing to measure the angle should first designate the vessel of interest, for example by positioning a cursor on the screen displaying the echographic image. Said initial point can thus be designated, after which the method for measuring the Doppler angle can be automatically performed in an exact and very fast manner.

A version of the method defined above includes a supplementary validation step which consists in validating the value of the Doppler angle DA only for a correlation coefficient r of the pixels of said set of N pixels which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)} \sqrt{N(S)y(n)y(n) - (S)y(n)(S)y(n)}} \quad (2)$$

The value chosen for Rm is preferably larger than 0.5, so that a minimum quality criterion is imposed as regards the angle measurement performed.

For the calculation of the slope a in conformity with the expression (1) and of the coefficient r in conformity with the expression (2), according to a further preferred version of the invention it is particularly attractive to perform the calculation of the terms in the expressions (1) and (2) for each triangular sector, formed by two rays whose ends have the coordinates xm, y(xm) and xM, y(xM) (where xM≧xm), on the basis of the following analytical formula:

$$sf = \int_{x_0}^{x_1} \int_{y_0}^{y_1} f(x,y)dx\,dy + \int_{x_1}^{x_2} \int_{y_2}^{y_3} f(x,y)dx\,dy \quad (3)$$

in which the function f(x,y) is given the following successive values: 1; x; y; xy; xx; yy, and $x_0$, $x_1$, $y_0$, $y_1$, $x_2$, $y_2$, $y_3$ are simple linear functions of the coordinates of said end points of the two rays (notably $x_0=0$, $x_1=xm$, $x_2=xM$), with 6 sets of possible values associated with 6 respective different classes of triangular sectors.

In order to carry out the above method it is proposed to use an arrangement (preferably a special-purpose workstation) which includes:

a memory for storing grey-level values of the echographic image in the form of a matrix of pixel values, a screen displaying the echographic image in the form of a two-dimensional matrix of pixels, pointer means for designating said initial point in the image, and calculation means which can access said memory and the pixel representative of said initial point, said calculation means being specifically programmed so as to execute the algorithms and calculations necessary for carrying out the method.

A vessel in an echographic image leaves a trace of its section which may be axially oriented in any direction with respect to a predetermined direction, for example, the edges of the screen. Moreover, in a customary operating mode the echographic excitation used for calculating the Doppler angle involves the assignment of a predetermined value which itself is also arbitrary. As a result, the Doppler angle DA measured may have any value between 0 and 90°. The value of DA has a substantial effect on the precision of the values of parameters characterizing the blood flow after application of a correction factor cos(DA) or sin(DA) to the components measured in the direction of the echographic excitation. This precision is poor notably for values of DA in the vicinity of 0° or 90° and a value of DA has been found which is optimum, which value is between 59° and 61° and typically equal to 60°: DAopt=60°.

If the value obtained for DA deviates too much from said optimum value, at present it is difficult, if not impossible, for the operator to change the excitation angle across the section of the blood vessel of interest in order to approach this value of 60°. It is the object of the invention to render this correction automatic.

To this end, the method in accordance with the invention for adjustment of the Doppler angle to a value close to a predetermined optimum value between the direction of an echographic excitation line and the axis of a blood vessel using an ultrasonic echographic image in the form of a two-dimensional matrix of pixels of grey levels, on the basis of the prior designation of an initial point situated in the vicinity of the axis of the relevant vessel, includes the following steps:

1) a first measurement of the Doppler angle DA1 for an excitation direction according to a first angular position, 2) comparison of said Doppler angle DA1 with a predetermined optimum value DAopt of the Doppler angle, yielding an angle difference value Δθ=|DAopt−DA1|, 3) correction of the direction of the echographic excitation by the value Δθ in order to shift it from the first position to a second position which produces a Doppler angle DA2 which is very close to DAopt.

The (extraction) measuring step for the Doppler angle is preferably performed in conformity with the process defined on the preceding pages. Moreover, the electronic correction of the Doppler angle imparts high flexibility to the method for adjustment of the Doppler angle because it is no longer necessary to change the orientation of the echographic probe during execution of this method. The electronic angulation is well known, for example from EP-A-0 210 624. Such angulation is possible with any type of probe (linear, phase-controlled network, curved . . . ), provided that it is a multi-element type.

An attractive version of the method for adjustment of the Doppler angle according to the invention, in which the temporal evolution of the speed distribution in the segment of the vessel is reproduced on a screen, provided for this purpose, in the form of a histogram showing the dynamic of the speeds as a function of time, referred to as a Doppler spectrum, comprises a supplementary step of automatically correcting the scale of the speeds represented in said Doppler spectrum in order to ensure that it contains the dynamic of the speeds observed along the axis of said blood vessel.

The described method for adjustment can also be applied for exact measurement of the distribution of the speeds in said blood vessel along said optimum echographic excitation line (also referred to as the instantaneous speed profile) and for determination of the instantaneous blood flow rate (also referred to as the blood flux) by subsequent spatial integration over the instantaneous section of the vessel.

Another application of the method for adjustment of the optimum Doppler angle consists of exact measurement of the displacements of the walls of said blood vessel.

In order to carry out the method for adjustment according to the invention it is proposed to utilize an arrangement (preferably a special-purpose workstation) which includes:

a screen for displaying the echographic image in the form of a two-dimensional matrix of pixels, a memory for storing the values of grey levels of the echographic image in the form of a matrix of pixel levels;

pointer means for designating said initial point in the image.

These and other aspects of the invention will be apparent from and elucidated with reference to the embodiments described hereinafter.

BRIEF DESCRIPTION OF THE DRAWINGS

In the drawings.

The contrast has been reversed for the sake of clarity of the FIGS. 2, 3, 4, 5, and 8.

DESCRIPTION OF THE PREFERRED EMBODIMENTS

All ultrasonic echography systems available at present utilize the measurement of the speed of a blood flow by way of a technique which is based on the Doppler effect. The differences between systems occur at the level of the implementation for which two techniques coexist: the so-called "frequential" approach of conventional Doppler and the "temporal" approach, for which reference is made to EP-B-0 225 667.

In all practical cases ultrasonic pulses are injected into the medium to be analyzed, presumably containing a blood vessel, with a period T (Pulse Repetition Frequency or PRF) and the ultrasonic signal returned by the medium in response to each pulse is recorded by the echograph (lines RF). Each sample of the lines RF thus represents the reflectivity of the medium at a given depth z or, equivalently, corresponds to a given time of flight t for the pulse. It is to be noted that the signal returned has traveled from the probe to the scatter center and back; if c is the speed of sound in the medium analyzed, therefore:

$z=ct/2$.

In a window situated at a given depth on a line RF (for example, in a blood vessel), the signal segment corresponds to a "signature" which belongs to the instantaneous spatial distribution of the scatter centers (blood cells) in the volume of interaction (resolution cell) between the medium analyzed and the ultrasonic beam. This signature belongs to a particular disposition of the scatter centers in the resolution cell, because it is the result of interference between all secondary sources constituting these scatter centers (speckle); statistically speaking, it is quasi-inimitable.

Consequently, if the PRF is so small that the scatter centers do not have time to change their spatial disposition significantly between two successive RF line acquisitions. a same group of scatter centers will impress strongly resembling signatures from one line to another, and its shift in the depth direction can be detected and followed in the course of time. It is for this phase of following at a given depth that the temporal technique (referred to as CVI or Color Velocity Imaging) and the frequential (or Doppler) technique differ: the Doppler technique marks the shift of a signature by analyzing the evolution of the local frequency of the successive lines RF, whereas the CVI technique directly analyses the temporal signal of the lines RF.

The shift of a given signature between two successive lines offers recourse to the speed v of the group of associated scatter centers via the time shift dt estimated by CVI ($dt=2vt/c$) or the dephasing estimated by the Doppler technique ($df=2Pf\, dt$), where f is the ultrasonic frequency of the pulse. Thus, these two methods are equivalent in theory.

If the angle between the axis of the ultrasonic beam and the direction of the flux of scatter centers is called the Doppler angle DA, the speed of the group of scatter centers considered, observed on the propagation axis of the pulses, will be the projection $v \cdot \cos(DA)$ of its real speed v; therefrom the following expression can be readily derived:

$v=c\, dt/(2T \cos(DA))$

Consequently, the Doppler angle constitutes a fundamental parameter for the estimation of the speed of a blood flow in an ultrasonic echograph, regardless of the method used for this estimation.

At present there are four major types of applications (referred to hereinafter as A, B, C, D) enabling the encoding or use of the speed information of a blood flow in a manner which is suitable for use in the medical field:

A—the representation of the speed information in the form of an image (or color speed map), B—the representation in the course of time of the evolution of the dynamic of the speeds, or a histogram of the speed distribution (Doppler spectrum), C—the determination of the blood flow rate (a technique developed by the applicant under the name CVI-Q), D—the extraction of arterial parameters linked to the study of the dilatation of the vessels in the course of the cardiac cycle.

The first three of these techniques appear to be functions linked to the measurement of the Doppler angle by way of the dependence of the speed on this parameter. The basic expressions for estimating the speed of a group of scatter centers on the basis of a time shift dt (CVI) or a phase shift df (Doppler) confirm:

CVI: $v=c\, dt/(2T \cos(DA))$

Doppler: $v=c\, df/(4P\, fT \cos(DA))$.

The technique D for that matter utilizes a dependency on $\sin(DA)$.

Principle of Color Speed Mapping (Application A):

An echograph displays, by default, a reflectivity image in grey levels which is formed by a juxtaposition of lines RF (whose envelope has been taken) recorded side-by-side in order to cover the zone of interest. These lines do not relate to the lines used for estimating the speed. A map of the speed distribution is formed by superposing on said reflectivity image a dynamic image (in the course of the cardiac cycle) for example by a color scale which corresponds to the scale of the instantaneous speeds observed in conformity with a given correspondence rule (color intensity proportional to the speed, color a function of the sign of the speed, . . . ).

In practice supplementary pulses (referred to as "colors") are emitted by the probe during the conventional image scanning and the above operation is applied thereto in order to detect shifts in the image region of interest (presumably containing a blood vessel). The parameter dt (or df) is estimated in all locations of the lines RF, "colors" corresponding to a pixel of the region of interest, and a color is assigned to this pixel in the dynamic image simply by application of the speed-color correspondence rule (or equivalently dt-color or df-color).

Principle of the Speed Distribution Histogram (Application B)

An echographic image (grey levels or color) corresponds to the emission of pulses spatially shifted relative to one another in order to scan the zone of interest of the medium. An alternative consists of injecting the successive pulses at the same location of the medium, so that the evolution of the lines RF can be observed in the course of time. If "color" excitations are mixed with this emission and processed in the same way as described above in order to estimate the parameter dt (or dt) and the locations of the blood flow, the evolution of the speed distribution in the course of time can be observed in the relevant segment of the excited vessel.

The representation of this evolution takes the form of a histogram showing the dynamic of the speeds as a function of time (either dt or df as a function of time). The histogram in question, corresponding to a true spectrum when it stems from the frequency analysis, is called a Doppler spectrum. The principle of its composition is very simple: the extremities of the dynamic of the parameter observed on the corresponding color lines are considered at the instant t before they are represented, and there is obtained the fork dt min<dt<dt max. The value of the Doppler angle DA being known, there is deduced therefrom the following dynamic of the speeds to be represented for this instant t:

$c\, dt\, min/(2T \cos(DA)) < v < c\, dt\, max/(2T \cos(DA))$

Thus, this speed dynamic is represented by plotting a line vertically to the abscissa t of the histogram, limited and governed by the extreme speed values observed.

Figure 1:
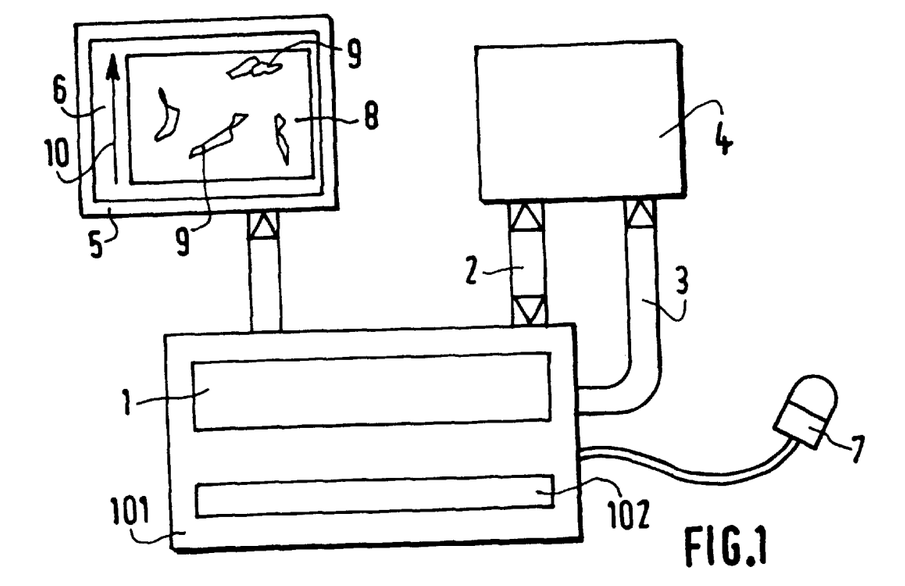
FIG. 1 shows the diagram of a workstation specifically arranged to carry out the invention.

The workstation shown in FIG. 1 comprises, in known manner, a microprocessor 1 which is connected to a memory 4, via a bidirectional data bus 2 and an address bus 3, and includes two peripheral apparatus which are formed by a monitor 5 for displaying data stored in the memory 4 on a screen 6 and a mouse 7 which enables the marking and tracing of points on the screen 6. When an echographic image 8, whose data are stored in the memory 4 in the form of pixels representative of grey levels, is displayed on the screen 6, a operator is faced by the customary problem of determining the orientation of traces such as 9 which stem from given blood vessels in the image whose echographic excitation direction is represented by the vector 10. Therefore, normally a small line segment which is oriented approximately according to the estimated largest diameter of the relevant trace is superposed on the trace chosen by means of the mouse. The angle searched, being the so-called Doppler angle which can be readily calculated by means of the processor 1, is then the angle between said small line segment (not shown) and the vertical which is identical to the direction of the echographic excitation in FIG. 1 (vector 10). This method is time consuming, intricate and not very accurate. In order to improve this situation, the microprocessor 1 is arranged to calculate said Doppler angle in a fast and exact manner on the basis of the designation of a single point, referred to as the initial point, within a blood vessel trace chosen by the user (the operator, the operator). To this end, a special-purpose processor 101, including the processor 1, is also provided with calculation means 102 necessary for carrying out the measurement of the Doppler angle DA and the invention as described hereinafter, in several sections which successively describe the principle of the method and its execution details and in an annex which specifies given calculations in detail.

Generally speaking, the method for measurement of DA comprises two steps: segmentation of the local trace 9 of the vessel in the image 8, and determination of the inertial axis over the group of resultant points which is referred to as a local mark.

Figure 2:
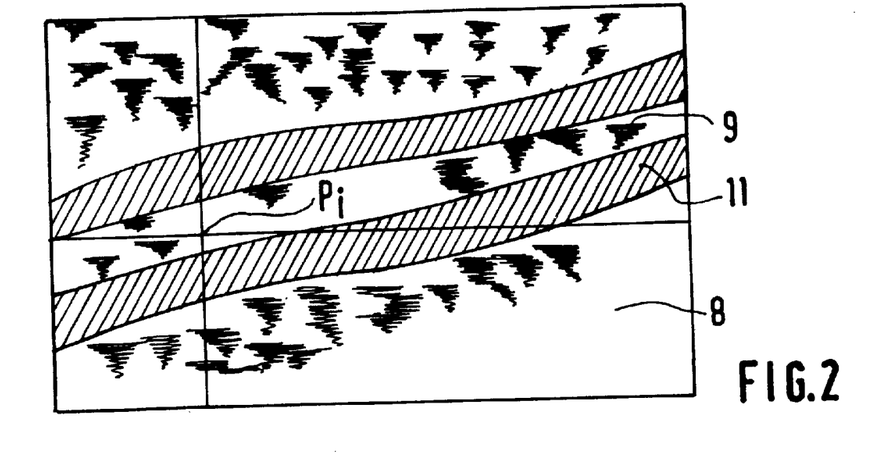
FIG. 2 shows an echographic image in which an initial point is selected.

An echographic image may contain the traces of several vessels which may be of interest to a operator, so that it is necessary for the operator to indicate the vessel of interest in the image, by means of the mouse of the system as shown in FIG. 2, or in another way, in which the initial point Pi is selected within the local trace 9 of a blood vessel.

Subsequently, in order to characterize alignment with the shape of the vessel chosen, first its local mark is extracted from the surrounding grey level in the image. This segmentation of the vessel is actually the detection of the walls of the vessel around the initial point indicated.

Preferably, the operator performs the pointing operation in a uniform dark part of the vessel and it is also necessary to have a threshold value available (referred to as $T_{i-1}$), which threshold value separates the reflectivity levels of the wall 11 from the reflectivity levels of the blood (trace 9), thus leaving the operator a given margin so as to avoid small tissue parts which are hardly visible and which could be present within the vessel.

For the determination of such a threshold value, use is preferably made of a conventional algorithm which is called ISODATA and is described in the work:

"Traitment numérique des images", by MURAT KUNT, COLLECTION TECHNIQUE ET SCIENTIFIQUE DES TELECOMMUNICATIONS PRESSES POLYTECHNIQUES ET UNIVERSITAIRES ROMANES.

This algorithm is based on a histogram of the grey levels of the pixels which comprises at least two classes. Preferably, a histogram comprising three classes is chosen: $CL_1$= VESSEL (low reflectivity), $CL_2$=INTERMEDIATE, and $CL_3$=WALL (high reflectivity). The threshold value $T_2$, situated between the class INTERMEDIATE and the class WALL, is used so as to achieve the desired reliable wall detection.

The thresholds enable determination as to whether the starting point suitably belongs to the class VESSEL; this may urge the operator to start pointing anew if the initial location is erroneous; thus, this constitutes an a posteriori validation of the initial point.

Figure 3:
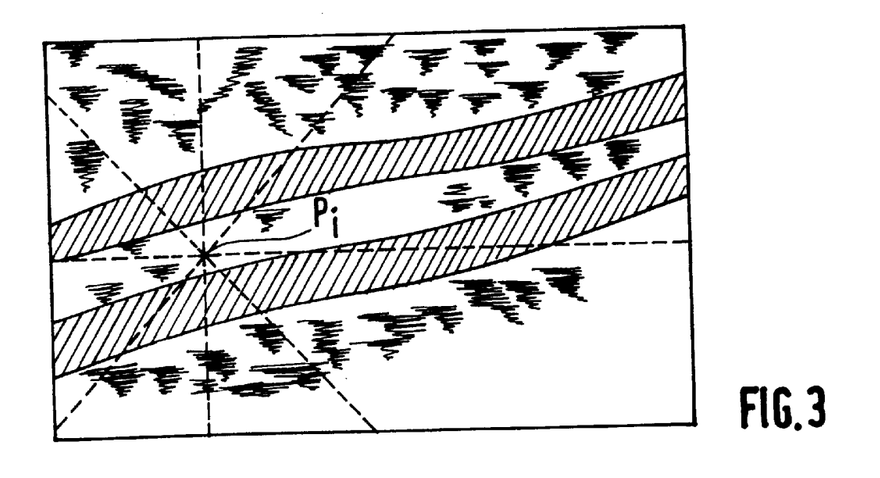
FIG. 3 illustrates the first tracing of rays from the initial point.

For as fast as possible operation a partial histogram utilizing a ray tracing method is used: from the chosen initial point Pi a predetermined number of radial rays which preferably are angularly distributed in an isotropic fashion are traced in the image until the edge is reached, and only the pixels encountered along the rays participate in the formation of the histogram. This ray tracing method is shown in FIG. 3.

Preferably, this first ray tracing operation is performed in a sub-image defined by the operator. The size of said sub-image, being rather reduced, is preferably chosen so that the entire dynamic of the grey levels present in the complete image is represented therein.

Figure 4:
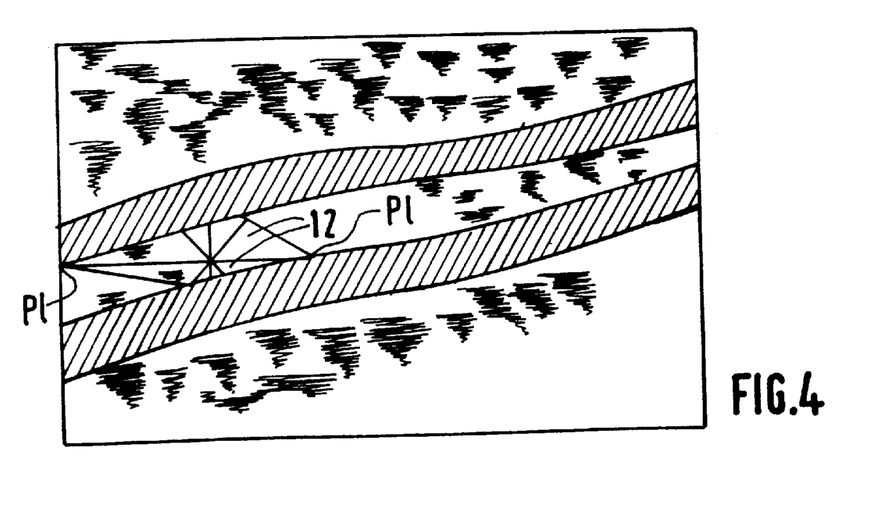
FIG. 4 shows the second tracing of rays which yields a first local mark.

When the ISODATA algorithm, or a similar algorithm, has produced the required threshold value ($T_{i-1}$), the same ray tracing method as described is performed so as to find the first pixel P1 relating to a wall along each ray (it is ensured that a start is made within the vessel because of prior intervention by the operator): the progression along each ray stops as soon as the grey-level value of the instantaneous pixel exceeds the threshold value $T_{i-1}$ (the reflectivity of the wall exceeds that of blood). If it happens that an edge of the image interrupts the mark of the vessel, the estimated end of the vessel in this direction does not constitute a true wall, but the pixels between two angularly adjacent rays will still constitute a fraction of the vessel. The latter step provides sampling of segments forming the limits of the vessel in the image and by joining the extremities of each pair of successive rays a representation of the vessel is obtained which is composed of triangular sectors 12 as shown in FIG. 4.

These sectors are characterized by the coordinates of their external apexes $P1_j$, $P1_{j+1}$, the third point being the common origin Pi. For each sector six analytical formulas applied to the coordinates of its two external apexes supply the local information necessary to enable ultimately the determination of the inertial axis of the local mark of the vessel.

Figure 5:
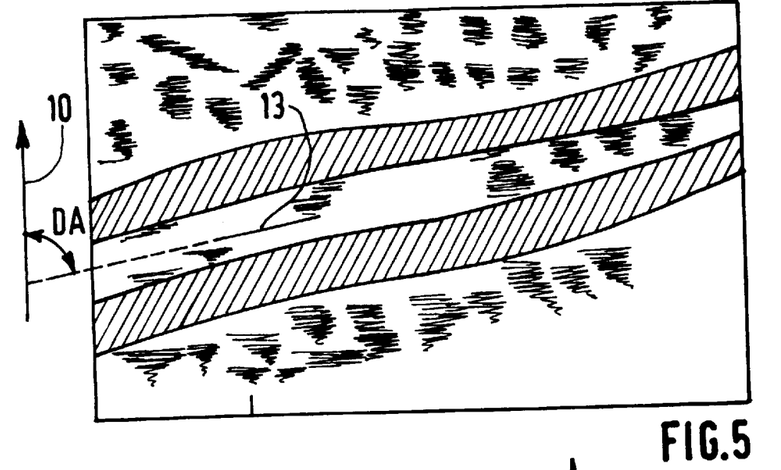
FIG. 5 shows the regression line deduced from the first local mark.

The value of the Doppler angle DA (FIG. 5) is thus deduced directly from the slope a of the inertial axis 13, the direction of the ultrasonic transmission (or excitation) axis being known (vector 10), and finally a correlation coefficient r which can be calculated in parallel offers an indication of the relevance of the result obtained.

Figure 6:
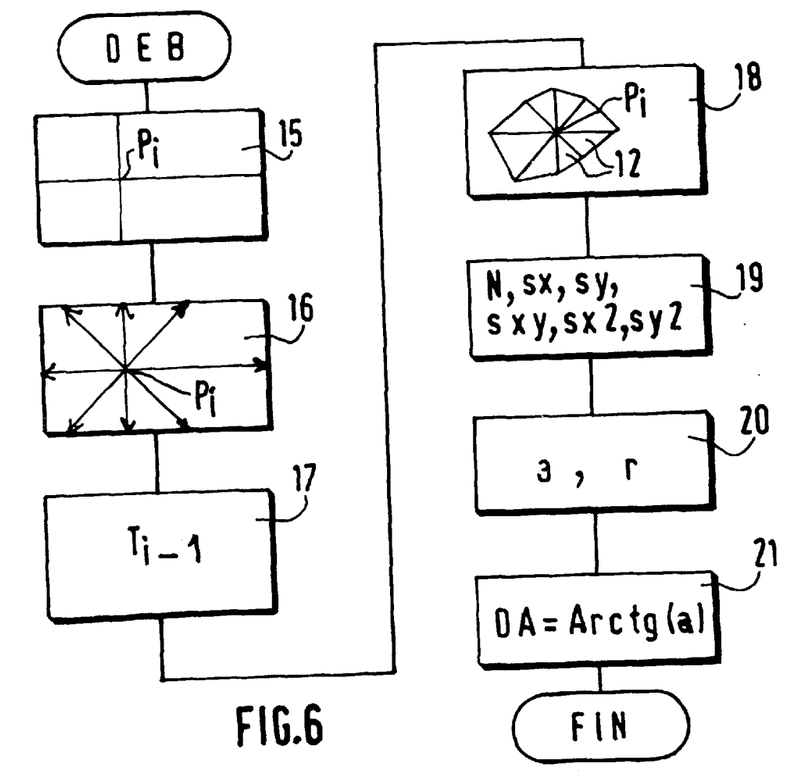
FIG. 6 shows a flowchart which summarizes the execution of an entire method for adjustment of the Doppler angle in accordance with the invention.
Figure 7A:
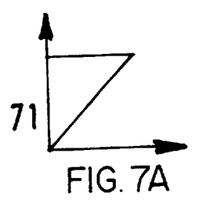
FIG. 7 shows the various feasible shapes of triangular sectors of the local mark.
Figure 7B:
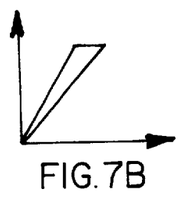
Figure 7C:
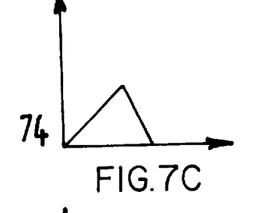
Figure 7D:
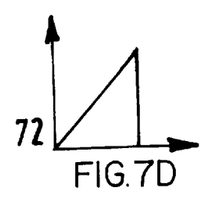
Figure 7E:
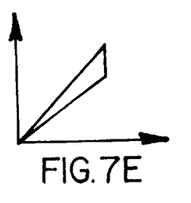
Figure 7F:
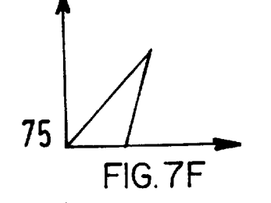
Figure 7G:
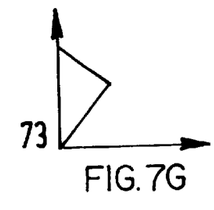
Figure 7H:
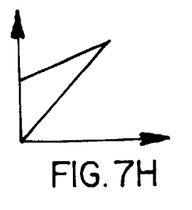
Figure 7I:
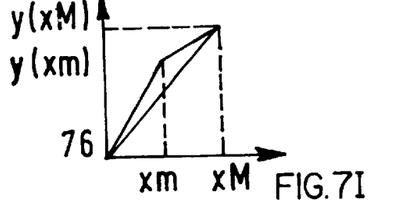
Figure 7J:
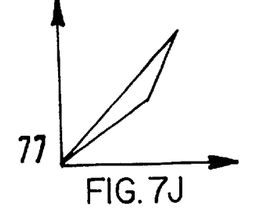

The execution of the entire process is summarized in the flow chart of FIG. 6. During the first step, at 15, the coordinates of the initial point (or pixel) Pi are stored in the memory 4 (see FIG. 1). At 16 the first ray tracing operation is performed, starting from the initial point, in the echographic image or sub-image. At 17 the threshold $T_{i-1}$ is determined on the basis of the histogram of the selected points. At 18 a second ray tracing operation, associated with the threshold $T_{i-1}$, enables formation of the first local mark which is constituted by assembled triangular sectors 12. At 19 the calculations and the accumulations are performed for the sectors. At 20 the results obtained during the preceding step are used for the step for determining the inertial axis (calculation of a and possibly of r) and finally the result, so the angle DA, is obtained in the step 21. The following is an example of the execution of the described process. It will be noted first of all that the process considered requires the same sampling step on the horizontal and vertical axes; therefore, it must be applied to images which have first been subjected to a digital scan conversion (DSC) operation. As DSC is a prior necessity for processing, the images may be acquired from any type of transducer network. Actually, the image used as a basis in this case is the reflectivity image in grey levels which is customarily displayed on the screen of the system (of the workstation).

RAY TRACING AND FORMATION OF THE HISTOGRAM

First of all, the operator performs a pointing operation in the image so as to designate a location in the vessel. The ray tracing operation then consists in the recursive addition (by simple programming which will be evident to those skilled in the art) of pairs of shifts in x and in y (each pair characterizing a ray) to the coordinates of this location until the edge of the image or the sub-image is reached. For each intermediate position a pixel of the image is addressed along a linear ray (see FIG. 3). Evidently, the larger the number of rays, the better the sampling of the area of the vessel will be. In practice it has been found that taking less than 32 rays could occasionally be.

If the number of grey levels in the image is denoted as NGL, this processing step yields a set of NGL integers, for example in the form of a histogram.

ISODATA COALESCENCE ALGORITHM

This algorithm aims to determine threshold values so as to classify the pixels of the image segmented in nc groups having a physical significance in respect of the contents of the image.

In this case three (nc=3) classes (VESSEL, INTERMEDIATE, WALL) are chosen whose behavior (the reflectivity) is well known, and the threshold value $T_2$ between the classes INTERMEDIATE and WALL is needed. This grouping algorithm performs an overall segmentation of the image by determination of threshold values deduced from the histogram of the grey levels of the image which, therefore, is not dependent (at least not in the first order) on the location of the object to be segmented. This algorithm necessitates only an initial choice of the value of the mean grey level for each class and iterative updating of these values is terminated by the supply of threshold values between classes.

First (initialization) step:

Let h(j) be the probability density of the grey-level value j in the original image and let [min,max] be the smallest grey-level value interval encompassing the values of h(j) which are not zero.

Let $m_i$, $i \in \{1, \ldots, nc\}$ be the mean initial value for all classes. This initial estimation may be carried out by dividing the grey level-axis into nc equidistant intervals and calculating the arithmetical mean value in each interval.

Second step:

The (nc−1) threshold values $T_i$ are estimated by utilizing the following relation (where [x] represents the integer part of x):

$$T_i = [(m_i + m_{i+1})/2], i \in \{1, \ldots, nc-1\}$$

All pixels whose grey-level values are situated in the interval:

$$A_i = [T_{i-1}, T_i], i \in \{1, \ldots, nc\},$$

are then assigned to the class i (where $T_o$=min−1 and $T_{nc}$=max).

Third step:

The mean values of the classes are updated by utilizing the following relation (where [x] represents the integer part of x):

$$m_i = \left[\frac{\left[\sum_{j \in A_i} jh(j)\right]}{\left[\sum_{j \in A_i} h(j)\right]}\right], i\{1, \ldots, nc\}$$

Fourth and last (iteration) step:

If at least one of the $m_i$ values has been modified during the third step, it is necessary to return to the second step, thus performing a loop until the algorithm converges; if not, the final threshold values are obtained. This processing step yields an integer threshold value $T_{i-1}$ which separates the blood from the arterial walls across the image.

Apart from the described ISODATA algorithm, each other algorithm can be used that allows a separation between grey levels of vessel and wall.

WALL DETECTION AND REPRESENTATION OF THE VESSEL IN SECTORS

Once the desired threshold value $T_{i-1}$ has been obtained, the same ray tracing method is carried out as described above in order to detect the area where the wall of the vessel commences, along each ray scanned, simply by comparing the grey levels of the pixels along a ray with the threshold value. The coordinates of the last pixel, marking the presence of the wall, along each ray is stored in a memory (the memory 4 in FIG. 1).

Thus, sampling of the limits of the wall of the vessel in the image is achieved and, by joining each pair of ends of rays which succeed one another angularly, a representation of the vessel is obtained which is composed of triangular radial sectors which constitute a local mark (see FIG. 4).

Let nr be the number of rays. This processing step produces two sets of nr integer numbers whose values, indexed by s, correspond to the coordinates of the last point of the ray indexed by s, so $P1_s$.

CHARACTERIZATION OF THE REPRESENTATION IN SECTORS

The object is to supply the following two parameters:

the determination of the slope a of the inertial axis of the first local mark, for the N pixels, having the coordinates x(n) and y(n) of said first local mark, as:

$$a = \frac{-2(S)x(n)y(n)}{(S)x(n)x(n) - (S)y(n)y(n) + \sqrt{4((S)x(n)y(n))^2 + ((S)x(n)x(n) - (S)y(n)y(n))^2}}$$

where (S) means:

$$\sum_{n=1}^{n=N}$$

and $n \in \{1, \ldots, N\}$ the correlation coefficient r whose absolute value will be nearer to 1 as the representation in sectors is nearer to a set of points in a regular array along a given axis $(0 \leq |r| \leq 1)$:

$$r = \frac{N\sum_{n=1}^{n=N}x(n)y(n) - \sum_{n=1}^{n=N}x(n)\sum_{n=1}^{n=N}y(n)}{\sqrt{N\sum_{n=1}^{n=N}x(n)x(n) - \sum_{n=1}^{n=N}x(n)\sum_{n=1}^{n+N}x(n)}\sqrt{N\sum_{n=1}^{n=N}y(n)y(n) - \sum_{n=1}^{n=M}y(n)\sum_{n=1}^{n=N}y(n)}}$$

As an alternative, the slope a may be that of the regression line deduced by the conventional least-squares method which produces the tangent of the Doppler angle DA (DA= Arctg a):

$$a = \frac{N\sum_{n=1}^{n=N}x(n)y(n) - \sum_{n=1}^{n=N}x(n)\sum_{n=1}^{n=N}y(n)}{N\sum_{n=1}^{n=N}x(n)x(n) - \sum_{n=1}^{n=N}x(n)\sum_{n=1}^{n=N}xn}$$

The two values obtained for a, with the two methods or (inertial axis or regression line) are necessarily very close to one another.

Another alternative may be envisaged for the supplementary step for validating the value of the Doppler angle DA automatically measured by the described method. This supplementary validation step consists, for example in validating the Doppler angle DA only if the symmetry of said local mark around its regression line (or its inertial axis) is deemed to be sufficient, said symmetry being deduced from the calculation of the centered moment of the third order.

From a practical point of view, the determination of these two values (a and r) requires measurement and accumulation, over the whole local mark, of six different quantities (six terms) deriving a contribution from the coordinates of each pixel contained therein:

N (total number of pixels), $$sx = \sum_{n=1}^{n=N}x(n), \ sy = \sum_{n=1}^{n=N}y(n),$$

$$sxy = \sum_{n=1}^{n=N}x(n)y(n), \ sy2 = \sum_{n=1}^{n=N}y(n)y(n), \ sx2 = \sum_{n=1}^{n=N}x(n)x(n).$$

This justifies the decomposition of the local mark of the vessel into triangular sectors: the values of the above parameters, characterizing all points contained in a given sector, can indeed be deduced from the coordinates of the two external apexes of this sector exclusively. This signifies that the characterization of a sector is realized by application of six analytical formulas to four integer values as explained hereinafter.

Let [xm,y(xm)] and [xM,y(xM)] be the coordinates of the two external apexes (P1$_i$, P1$_{i+1}$), with xM≧xm, the sector considered being situated, by symmetry in the first trigonometric quadrant at the top and the right (by multiplication of the negative coordinates by −1 until x>0 and y>0). Six different types of different possible sectors are obtained, being restricted to the first quadrant in this configuration, in dependence on the values and the scheduling of the coordinates of the external apexes as shown in FIG. 7 (see notably line 76 of FIG. 7).

In this Figure seven classes of sectors can be distinguished which represent all possible shapes of sectors, said classes being shown as seven lines which are referenced as 71, 72, 73, 74, 75, 76, 77 from the top down, the lines 71, 72 and 73 each representing two sector shapes which both relate to the same respective class. These classes are characterized as follows:

71: y(xm)=y(xM)
72: xin=xM
73: xm=0
74: y(xM)=0
75: y(xm)=0
76: y(xm)>y(xM)×xm/xM
77: y(xm)<y(xM)×xm/xM.

The classes of the lines 76 and 77, being characterized by inequalities in opposite sense in relation to the same expression, may be considered as belonging to the same class from a mathematical point of view.

The above analytical formulas, used for the calculations, are:

$$sf = \int_{x=0}^{x=xm}\int_{y=a_0x}^{y=a_1x}f(x,y)dxdy + \int_{x=xm}^{x=xM}\int_{y=a_2x+b_2}^{y=a_3x+b_3}f(x,y)dxdy$$

where:
f(x,y)=1 for deducing the pixels and obtaining N
f(x,y)=x for obtaining sax
f(x,y)=y for obtaining sigh
f(x,y)=xy for obtaining sexy
f(x,y)=xx for obtaining sx2
f(x,y)=yy for obtaining sy2

The integration limits, of course, are dependent on the shape of the sector as indicated in Annex 1 (relating to the classes of FIG. 7), but the ultimate expressions to be calculated so as to perform the summing for each type of sector are very simple and do not require a substantial calculation effort as indicated in Annex 2 (relating to the classes of FIG. 7).

When each sector of the representation of the vessel has been treated, the actual regression can be performed.

LINEAR REGRESSION AND ESTIMATION OF THE VALIDITY OF THE RESULT

The Doppler angle DA and the reliability criterion r are obtained directly from the six values supplied at the end of the foregoing step, after treatment of all sectors:

$$a = \frac{Nsxy - sxsy}{Nsx2 - sxsx}$$

and: DA=Arctg(a)
On the other hand:

$$R = \frac{Nsxy - sxsy}{\sqrt{Nsx2 - sxsx}\sqrt{Nsy2 - sysy}}$$

This value r is a control parameter which may be used to provide a reliability criterion for the measurement: if its value is greater than, for example 0.5, the result may be considered to be reliable; if not, there has been a problem preventing the system from supplying a valid result (notably a local mark having a circular shape due to poor positioning of the sectional plane) and the operator will have to make another attempt after correction.

The basic method described above can be refined by applying it to successive areas within the vessel by automatic centering.

Once a first representation in sectors of the vessel has been realized, it is easy to calculate the coordinates of its center of gravity G (for example, by taking the mean value of the abscissae and the ordinates of the pixels of the first local mark and, while choosing this point G as the new initial point, by repeating the entire process described above so as to determine an optimized second local mark and also an optimized Doppler angle. This enhancement of the method offers the operator a larger margin in respect of the choice of the initial point, so that he can benefit from automatic centering within the vessel (for example, it is thus possible to indicate, using the mouse of the workstation, a location close to a wall without being penalized), and the results obtained will be more reliable (standard deviation less than 1°).

It is to be noted that after a first iteration the entire process may be reiterated, for example a predetermined number of times, which may be as high as 20, + or until convergence on a particular point is obtained. The latter point corresponds to the center of gravity of the entire trace of the vessel in the echographic image and not only to that of the first local mark deduced from the choice of the first initial point by the operator. Thus, the method no longer concerns a local measurement, but offers the best environment along the entire trace of the vessel for extraction of the value of the Doppler angle therefrom.

Figure 8:
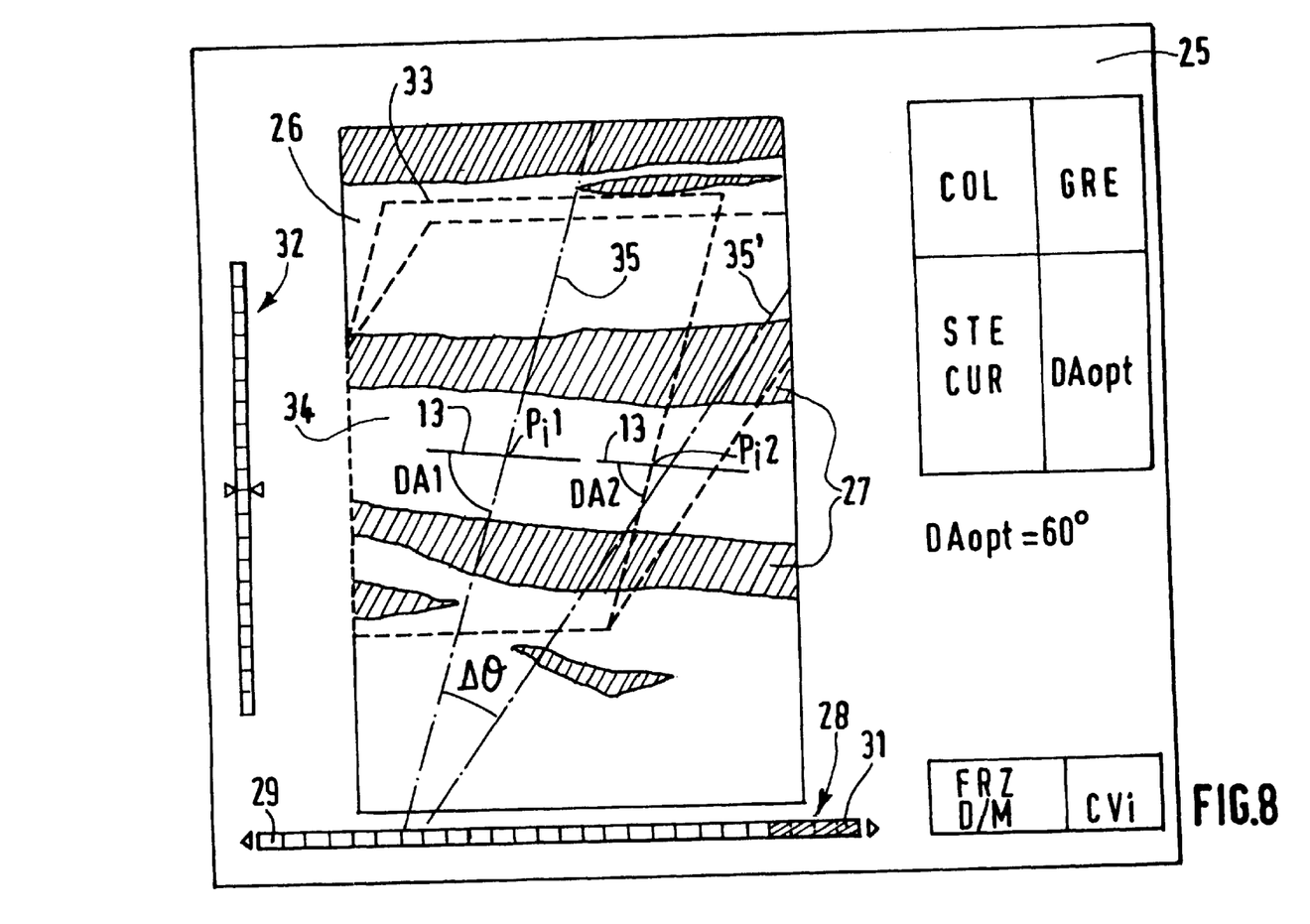
FIG. 8 shows the display screen for the echographic image in the so-called CVI mode for an explanation of the invention.

In FIG. 8, the echographic image is represented in a rectangle 26 on the screen 25 shown in FIG. 8. This image is composed essentially of a reflectivity image in grey levels (the hatched zones represent the clearest levels in the Figure, notably the walls 27 of an artery). This image is formed by a juxtaposition of lines RF whose envelopes have been taken and recorded side-by-side in order to cover the zone of interest. A grey scale is denoted by the reference 28 at the bottom of the Figure and extends from the darkest level 29 to the brightest level 31.

A map of the distribution of the blood speeds (in the artery visible at the center of the image) is formed by superposing a dynamic image (in the course of the cardiac cycle) on this reflectivity image, in false colors, its color scale corresponding to the scale of the instantaneous speeds observed according to a given correspondence rule (color intensity proportional to the speed, color as a function of the sign of the speed). In the Figure the color scale 32 has zero at its center and represents, for example the negative speeds in its lower part in blue, from dark to bright while starting from zero, and the positive speeds in red at the top, the red becoming yellow for the highest positive speeds.

The colored part in the image 26 is situated at the intersection of a sub-window 33, denoted by the dashed lines, and the interior of a blood vessel, so the zone 34. The options chosen for the representation of the echographic image are indicated in the boxes at the right of the Figure, notably:

GRE for: grey level image
COL for: dynamic image in superposed colors
CUR for: representation of the segment (13 or 13') indicating the direction of the blood flow (at the point PI1 or PI2),
STE for: automatic electronic angulation mode for the echographic excitation direction,
DAopt for: possibility of choosing a Doppler angle (DAopt= 60° in the present case).

The operations required for the adjustment of the Doppler angle to its optimum value in accordance with the invention are executed as follows:

First of all, the operator selects an initial point in the zone 34, so Pi1.

The slope a of the segment 13 is automatically calculated as described above and the segment 13 is imposed on the image, the point Pi1 being situated at the intersection of the segment 13 and the echographic excitation direction 35.

The value of the Doppler angle DA1 is possibly displayed on the screen 25 (in a manner not shown).

The processor 101 (FIG. 1) calculates: $|DA1-DAopt|=\Delta\theta$ and electronically and automatically modifies the excitation direction by the value $\Delta\theta$ in order to shift it from the position 35 to the position 35' for which the Doppler angle DA2 is very close to DAopt.

After verification by the operator that the excitation 35' is suitably situated within the zone of interest of the vessel, the operator selects a new initial point Pi2 and starts the automatic measurement of the Doppler angle DA2.

Alternatively, the method according to the invention can be completely automatically executed by taking for the point Pi2 the point of intersection of the lines 13 and 35' whose coordinates are calculated by the special-purpose microprocessor 101.

Another alternative yet consists in choosing the center of rotation, transforming the line 35 into the line 35', to be situated at the point Pi1, which offers the advantage that exactly the same zone of the blood vessel under echographic examination is maintained.

The accumulated precision offered by the present invention in respect of the measurement of the blood speed in the vessels is valuable for applications in vascular echography whose principal aspects are: the automatic correction of the scale of the speeds in the so-called CVI mode (Color Velocity Imaging), so the scale 32 in FIG. 8, or the speed scale in a Doppler spectrum for which it contains the dynamic of the speeds observed along the axis of the blood vessel.

Another interesting application of the invention is exact measurement of the distribution of the speeds in a blood vessel along said optimum echographic excitation line which is also called the instantaneous speed profile, and the determination of the instantaneous blood flow rate, which is also called the blood flux, by subsequent spatial integration over the instantaneous section of the vessel.

As a result of the invention, multiplicative correction by sin DA enables exact measurement of the displacements of the walls of the blood vessel, said displacements taking place in a direction substantially perpendicular to that of the blood globules.

ANNEX 1

Integration limits for each triangular sector configuration

| | |
|---|---|
| line 1: | $a_0 = y(xm)/xM$ |
| $y(xm) = y(xM)$ | $a_1 = y(xm)/xm$ |
| | $a_2 = y(xm)/xM$ |
| | $b_2 = a_3 = 0$ |

ANNEX 1-continued

Integration limits for each triangular sector configuration

|  |  |
|---|---|
| | $b_3 = y(xm)$ |
| line 2: | $a_0 = MIN[y(xm), y(xM)]/xm$ |
| xM = xm | $a_1 = MAX[y(xm), y(xM)]/xm$ |
| | $a_2 = b_2 = a_3 = b_3 = 0$ |
| line 3: | $a_0 = a_1 = b_2 = 0$ |
| xm = 0 | $a_2 = y(xM)/xM$ |
| | $a_3 = [y(xM) - y(xm)]/xM$ |
| | $b_3 = y(xm)$ |
| line 4: | $a_0 = a_2 = b_2 = 0$ |
| y(xM) = 0 | $a_1 = y(xm)/xm$ |
| | $a_3 = -y(xm)/xM - xm$ |
| | $b_3 = y(xm) - a_3 \times xm$ |
| line 5: | $a_0 = b_3 = 0$ |
| y(xm) = 0 | $a_1 = y(xM)/xM$ |
| | $a_2 = y(xM)/(xM - xm)$ |
| | $b_2 = -a_2 \times xm$ |
| | $a_3 = y(xM)/xM$ |
| lines 6 and 7: | $a_0 = y(xm)/xm$ or $y(xM)/xM$ |
| y(xm) | $a_1 = y(xM)/xM$ or $y(xm)/xm$ |
| < or > | $a_2 = [y(xM) - y(xm)]/(xM - xm)$ or $y(xM)/xM$ |
| y(xM) × xm/xM | $b_2 = y(xm) - a_2 \times xm$ or 0 |
| | $a_3 = y(xM)/xM$ or $[y(xM) - y(xm)]/(xM - xm)$ |
| | $b_3 = 0$ or $y(xm) - a_3 \times xm$ |

ANNEX 2

Expressions to be calculated (in this Table s + = x signifies: add x to s)

|  |  |
|---|---|
| line 1: | $sn + = y(xm) \times (xM - xm)/2$ |
| y(xm) = y(xM) | $sax + = y(xm) \times (xM - xm) \times (xM + xm)/8$ |
| | $sigh + = y(xm)^2 \times (xM - xm)/3$ |
| | $sexy + = y(xm)^2 \times (xM - xm) \times (xM + xm)/8$ |
| | $sx2 + = y(xm) \times (xM^3 - xm^3)/12$ |
| | $sy2 + = y(xm)^3 \times (xM - xm)/4$ |
| line 2: | $YMAX = MAX[y(xm), y(xM)]$ |
| xM = xm | $YMIN = MIN[y(xm), y(xM)]$ |
| | $sn + = xm \times (YMAX - YMIN)/2$ |
| | $sax + = xm^2 \times (YMAX - YMIN)/3$ |
| | $sigh + = xm \times (YMAX - YMIN) \times (YMAX + YMIN)/6$ |
| | $sexy + = xm^2 \times (YMAX - YMIN) \times (YMAX + YMIN)/8$ |
| | $sx2 + = xm^3 \times (YMAX - YMIN)/4$ |
| | $sy2 + = xm \times (YMAX^3 - YMIN^3)/12$ |
| line 3: | $sn + = xM \times y(xm)/2$ |
| xm = 0 | $sax + = xM^2 \times y(xm)/6$ |
| | $sigh + = xM \times y(xm) \times [y(xM) + y(xm)]/6$ |
| | $sexy + = xM^2 \times y(xm) \times [2 \times y(xM) + y(xm)]/24$ |
| | $sx2 + = xM^3 \times y(xm)/12$ |
| | $sy2 + = xM \times y(xm) \times [y(xM)^2 + y(xM) \times y(xm) + y(xm)^2]/12$ |
| line 4: | $sn + = xM \times y(xm)/2$ |
| y(xM) = 0 | $sax + = xM \times y(xm) \times (xM + xm)/6$ |
| | $sigh + = xM \times y(xm)^2/6$ |
| | $sexy + = xM \times y(xm)^2 \times (xM + 2 \times xm)/24$ |
| | $sx2 + = xM \times y(xm) \times (xM^2 + xM \times xm + xm^2)/12$ |
| | $sy2 + = xM \times y(xm)^3/12$ |
| line 5: | $sn + = xm \times y(xM)/2$ |
| y(xm) = 0 | $sax + = xm \times y(xM)(xM + xm)/6$ |
| | $sigh + = xm \times y(xM)^2/6$ |
| | $sexy + = xm \times y(xM)^2 \times (2 \times xM + xm)/24$ |
| | $sx2 + = xm \times y(xM) \times (xM^2 + xM \times xm + xm^2)/12$ |
| | $sy2 + = xm \times y(xM)^3/12$ |
| lines 6 and 7: | $sn + = [xm \times y(xM) - xM \times y(xm)]/2$ |
| y(xm) < | $sax + = (xM + xm) \times [xm \times y(xM) - xM \times y(xm)]/6$ |
| y(xM × xm/xM | $sigh + = [y(xM) + y(xm)] \times [xm \times y(xM) - xM \times y(xm)]/6$ |
| if | $sexy + = [xm \times y(xM) - xM \times y(xm)] \times [2 \times xM \times y(xM) + xm \times y)xM) + xM \times y(xm) + 2 \times xm \times y(xm)]/24$ |
| y(xm) > | |
| y(xM) xm/xM | |
| multiply each | $sx2 + = [xm \times y(xM) - xM \times y(xm)] \times (xM^2 + xM \times xm + xm^2)/12 +$ |
| expression | |

ANNEX 2-continued

Expressions to be calculated (in this Table s + = x signifies: add x to s)

|  |  |
|---|---|
| by −1. | $sy2 = [xm \times y(xM) - xM \times y(xm)] \times [y(xM)^2 + y(xM) \times (xm) + y(xm)^2]/12$ |

I claim:

1. A method for measurement of the Doppler angle in the trace of a blood vessel in an echographic image, starting from a designated point in the direct vicinity of said trace, comprising the following steps:

a) a first isotropic tracing of rays from said initial point, said rays traversing the echographic image so as to provide a histogram of the grey levels of selected points which are distributed along said rays, b) applying an algorithm to said histogram in order to classify the grey levels of said selected points into at least two classes $CL_1, CL_2, \ldots$, two adjoining classes being separated by thresholds $T_1, T_2, \ldots$, expressed in grey levels, one of the classes $CL_i$, bounded by the lower threshold $T_{i-1}$, being representative of the grey levels of the walls of the blood vessels in said image, c) determining with a second tracing of rays from said initial point, the first point P1 for each ray at which the grey level is equal to or higher then the threshold $T_{i-1}$, yielding a representation of said blood vessel in the form of a set of N pixels having the coordinates x(n) and y(n), d) determination of the slope a of the inertial axis from said set of N pixels, as:

$$a = \frac{-2(S)x(n)y(n)}{(S)x(n)x(n) - (S)y(n)y(n) + \sqrt{4((S)x(n)y(n)^2) + ((S)x(n)x(n) - (S)y(n)y(n))^2}} \quad (1)$$

where (S) means:

$$\sum_{n=1}^{n=N}$$

e) and calculation of the Doppler angle as: DA=Arc tg (a).

2. A method for measurement of the Doppler angle according to claim 1, which includes a supplementary validation by calculating a correlation coefficient r of the pixels of said set of N pixels which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)} \sqrt{N(S)y(n)y(n) - (S)y(n)(S)y(n)}}.$$

3. A method for adjustment of the Doppler angle to a value close to a predetermined optimum value, between the direction of an echographic excitation line and the axis of a blood vessel using an ultrasonic echographic image, in the form of a two-dimensional matrix of pixels of grey levels, on the basis of the prior designation of an initial point situated in the vicinity of the axis of the relevant vessel, which method comprises the following steps:

1) a first measurement of the Doppler angle DA1 for an excitation direction according to a first, 2) comparison of said Doppler angle DA1 with a predetermined optimum value DAopt of the Doppler angle, resulting in an angle-difference value $\Delta\theta=\_|DAopt-DA1|$, 3) automatic electronic correction of the direction of the echographic excitation by the value $\Delta\theta$ in order to change it from the first position to a second position which produces a Doppler angle DA2 which is approximately DAopt.

4. A method for automatic adjustment of the Doppler angle as claimed in claim 3, for which DAopt has a predetermined value of approximately 60 degrees, preferably between 59 and 61 degrees.

5. A method for automatic adjustment of the Doppler angle as claimed in claim 3, in which the step 1) for automatic measurement of the Doppler angle DA include the following sub-steps:
   a) a first isotropic tracing of rays from said initial point, said rays traversing the echographic image, or a sub-image, so as to provide a histogram of the grey levels of selected points which are regularly distributed along said rays,
   b) applying an algorithm to said histogram in order to classify the grey levels of said selected points into at least two classes $CL_1$, $CL_2$, . . . , expressed in grey levels, two adjoining classes being separated by thresholds $T_1$, $T_2$, . . . , one of the classes $CL_i$, bounded by the lower threshold $T_{i-1}$, being representative of the grey level of the walls of the blood vessels in said image,
   c) a second tracing of rays from said initial point, during which the grey level of each point of each ray is compared with the threshold $T_{i-1}$ and each ray is limited to the first end point $P_1$ encountered whose grey level is equal to or higher than $T_{i-1}$, yielding a representation of said blood vessel in the form of a first local mark which is composed of triangular sectors which have said starting point within said first local mark in common,
   d) determination of the slope a of the inertial axis of said first local mark for the N pixels, having the coordinates x(n) and y(n), of said local mark as:

$$a = \frac{-2(S)x(n)y(n)}{(S)x(n)x(n) - (S)y(n)y(n) + \sqrt{4((S)x(n)y(n)^2) + ((S)x(n)x(n) - (S)y(n)y(n))^2}} \quad (1)$$

where (S) means:

$$\sum_{n=1}^{n=N}$$

and calculation of the Doppler angle as:
DA=Arc tg (a).

6. A method for adjustment of the Doppler angle as claimed in claim 3, including a supplementary validation step which consists in validating the value of the Doppler angle DA only for a correlation coefficient r of the pixels of said first local mark which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)}\sqrt{N(S)y(n)y(n) - (S)y(n)(S)y(n)}}.$$

7. A method for adjustment of the Doppler angle as claimed in claim 3, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)\,dx\,dy + \int_{x_1}^{x_2}\int_{y_2}^{y_3} f(x,y)\,dx\,dy$$

in which the function f(x,y) is given the following successive values: 1; x; xy; xx; yy, and the coefficients $a_0$, $a_1$, $a_2$, $b_2$, $a_3$, $b_3$ are given sets of values which are dependent only on the coordinates of said end points of the two rays, six sets of possible values being associated with six respective different classes of triangular sectors.

8. A method for adjustment of the Doppler angle as claimed in claim 5, characterized in that for the step 1) it includes a supplementary positioning step which consists in determining, by calculation, the center of gravity G of said first local mark, said center of gravity G then being chosen as the new initial point optimized for optimized determination of the Doppler angle during said step 1) of the method for adjustment of the Doppler angle DA.

9. A method for adjustment of the Doppler angle as claimed in claim 3, in which the evolution of the speed distribution in the course of time in the relevant segment of the vessel is reproduced, on a screen provided for this purpose showing the dynamic of the speeds as a function of time, referred to as a Doppler spectrum, there being executed a supplementary step which consists of automatically correcting the scale of the speeds represented in said Doppler spectrum in order to ensure that it contains the dynamic of the speeds observed along the axis of said blood vessel.

10. A method for adjustment of the Doppler angle as claimed in claim 3 for exact measurement of the speed distribution in said blood vessel along said echographic excitation line, also being called the instantaneous speed profile, and for determining the instantaneous blood flow rate, also being called the blood flux, by subsequent spatial integration over the instantaneous section of the vessel.

11. A method for adjustment of the optimum Doppler angle as claimed in claim 3 for exact measurement of the displacements of the walls of said blood vessel.

12. An arrangement for adjustment of the Doppler angle between the direction of an echographic excitation line and the axis of a blood vessel using an ultrasonic echographic image, formed as a grey-level image, on the basis of the prior designation of an initial pixel situated in the vicinity of the axis of the relevant vessel, which arrangement includes:
   a screen for display of the echographic image in the form of a two-dimensional matrix of pixels,
   a memory for storing the values of grey levels and colors of the echographic image in the form of a matrix of pixel levels,
   pointer means for designating said initial pixel in the image, and
   calculation means which can access said memory and said initial pixel, the calculation means being arranged to perform:
   1) a first automatic measurement of the Doppler angle DA1 for an excitation direction according to a first predetermined angular position,
   2) comparison of said Doppler angle DA1 with a predetermined optimum value DAopt of the Doppler angle, yielding an angle-difference value $\Delta\theta=|DAopt-DA1|$, and 3) correction of the direction of the echographic excitation by the value Δθ in order to shift it from the first position to a second position which produces a Doppler angle DA2 which is very close to DAopt $$a = \frac{-2(S)x(n)y(n)}{(S)x(n)x(n) - (S)y(n)y(n) + \sqrt{4((S)x(n)y(n)^2) + ((S)x(n)x(n) - (S)y(n)y(n))^2}} \quad (1)$$

where (S) means:

$$\sum_{n=1}^{n=N}.$$

13. A method for the adjustment of the Doppler angle according to claim 3, including a supplementary validation step which consists in validating the value of the Doppler angle DA only for a correlation coefficient r of the pixels of said first local mark which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)}\sqrt{N(S)y(n)y(n) - (S)y(n)(S)y(n)}}.$$

14. A method for adjustment of the Doppler angle according to claim 5, including a supplementary validation step which consists in validating the value of the Doppler angle DA only for a correlation coefficient r of the pixels of said first local mark which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)}\sqrt{N(S)y(n)y(n) - (S)y(n)(S)y(n)}}.$$

15. A method for adjustment of the Doppler angle as claimed in claim 3, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)dx\,dy + \int_{x_1}^{x_2}\int_{y_2}^{y_3} f(x,y)dx\,dy$$

in which the function f(x,y) is given the following successive values: 1; x; xy; xx; yy, and the coefficients $a_0, a_1, a_2, b_2, a_3, b_3$ are given sets of values which are dependent only on the coordinates of said end points of the two rays, six sets of possible values being associated with six respective different classes of triangular sectors.

16. A method for adjustment of the Doppler angle as claimed in claim 4, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)dx\,dy + \int_{x_1}^{x_2}\int_{y_2}^{y_3} f(x,y)dx\,dy$$

in which the function f(x,y) is given the following successive values: 1; x; xy; xx; yy, and the coefficients $a_0, a_1, a_2, b_2, a_3, b_3$ are given sets of values which are dependent only on the coordinates of said end points of the two rays, six sets of possible values being associated with six respective different classes of triangular sectors.

17. A method for adjustment of the Doppler angle as claimed in claim 5, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)dx\,dy + \int_{x_1}^{x_2}\int_{y_2}^{y_3} f(x,y)dx\,dy$$

in which the function f(x,y) is given the following successive values: 1; x; xy; xx; yy, and the coefficients $a_0, a_1, a_2, b_2, a_3, b_3$ are given sets of values which are dependent only on the coordinates of said end points of the two rays, six sets of possible values being associated with six respective different classes of triangular sectors.

18. A method for adjustment of the Doppler angle as claimed in claim 6, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)dx\,dy + \int_{x_1}^{x_2}\int_{y_2}^{y_3} f(x,y)dx\,dy$$

in which the function f(x,y) is given the following successive values: 1; x; xy; xx; yy, and the coefficients $a_0, a_1, a_2, b_2, a_3, b_3$ are given sets of values which are dependent only on the coordinates of said end points of the two rays, six sets of possible values being associated with six respective different classes of triangular sectors.

19. A method for adjustment of the Doppler angle as claimed in claim 13, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1}\int_{y_0}^{y_1} f(x,y)dx\,dy + \int_{x_1}^{x_2}\int_{y_2}^{y_3} f(x,y)dx\,dy$$

in which the function f(x,y) is given the following successive values: 1; x; xy; xx; yy, and the coefficients $a_0, a_1, a_2, b_2, a_3, b_3$ are given sets of values which are dependent only on the coordinates of said end points of the two rays, six sets of possible values being associated with six respective different classes of triangular sectors.

20. A method for adjustment of the Doppler angle as claimed in claim 14, characterized in that the terms for calculating the slope a of the inertial axis and/or the correlation coefficient r are calculated for each triangular sector formed by two rays whose ends have the coordinates xm, y(xm) and xM, y(xM) using the following analytical formula:

$$sf = \int_{x_0}^{x_1} \int_{y_0}^{y_1} f(x, y) dx dy + \int_{x_1}^{x_2} \int_{y_2}^{y_3} f(x, y) dx dy$$

in which the function f(x,y) is given the following successive values: 1; x; xy; xx; yy, and the coefficients $a_0$, $a_1$, $a_2$, $b_2$, $a_3$, $b_3$ are given sets of values which are dependent only on the coordinates of said end points of the two rays, six sets of possible values being associated with six respective different classes of triangular sectors.

* * * * *